US008098585B2

(12) United States Patent
Jiang et al.

(10) Patent No.: US 8,098,585 B2
(45) Date of Patent: Jan. 17, 2012

(54) RANKING THE IMPORTANCE OF ALERTS FOR PROBLEM DETERMINATION IN LARGE SYSTEMS

(75) Inventors: Guofei Jiang, Princeton, NJ (US); Haifeng Chen, Old Bridge, NJ (US); Kenji Yoshihira, Cranford, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 12/259,623

(22) Filed: Oct. 28, 2008

(65) Prior Publication Data

US 2009/0292954 A1 Nov. 26, 2009

Related U.S. Application Data

(60) Provisional application No. 61/054,824, filed on May 21, 2008.

(51) Int. Cl.
*H04J 1/16* (2006.01)
*H04J 3/14* (2006.01)
*H04L 1/00* (2006.01)
*H04L 12/26* (2006.01)

(52) U.S. Cl. ...................................... 370/241
(58) Field of Classification Search .................. 370/241, 370/231, 235, 252, 271, 272, 389, 401; 705/37, 705/36; 706/47; 340/517; 726/22; 379/15, 379/88; 455/450; 713/181
See application file for complete search history.

(56) References Cited

U.S. PATENT DOCUMENTS

| | | | | |
|---|---|---|---|---|
| 6,704,874 B1 * | 3/2004 | Porras et al. | ...................... | 726/22 |
| 7,259,666 B1 * | 8/2007 | Hermsmeyer et al. | ........ | 340/517 |
| 7,590,589 B2 * | 9/2009 | Hoffberg | ......................... | 705/37 |
| 7,636,424 B1 * | 12/2009 | Halikhedkar et al. | ...... | 379/15.01 |
| 2003/0225466 A1 * | 12/2003 | Yulevitch et al. | ................ | 700/80 |
| 2004/0177053 A1 * | 9/2004 | Donoho et al. | .................. | 706/47 |
| 2005/0278550 A1 * | 12/2005 | Mahone et al. | ................ | 713/189 |
| 2006/0053295 A1 * | 3/2006 | Madhusudan et al. | ......... | 713/181 |
| 2007/0087756 A1 * | 4/2007 | Hoffberg | ....................... | 455/450 |
| 2007/0179746 A1 | 8/2007 | Jiang et al. | | |
| 2007/0250427 A1 * | 10/2007 | Robinson | ..................... | 705/36 R |
| 2008/0027688 A1 | 1/2008 | Jiang et al. | | |
| 2008/0037736 A1 * | 2/2008 | Rapaport et al. | ............ | 379/88.23 |
| 2008/0228459 A1 | 9/2008 | Jiang et al. | | |

OTHER PUBLICATIONS

G. Jiang et al., Efficient and Scalable Algorithms for Inferring Likely Invariants in Distributed Systems; IEEE Transactions on Knowledge and Data Engineering; vol. 19, No. 11, Nov. 2007; pp. 1508-1523.

G. Jiang et al., Discovering Likely Invariants of distributed Transaction System for Autonomic System Management; 3rd Int'l Conference on Automatic Computing (ICAC2006), Dublin, Ireland; 2006; pp. 199-208.

\* cited by examiner

*Primary Examiner* — Hassan Phillips
*Assistant Examiner* — Prenell Jones
(74) *Attorney, Agent, or Firm* — Joseph Kolodka; James Bitetto (57) ABSTRACT

A system and method for prioritizing alerts includes extracting invariants to determine a stable set of models for determining relationships among monitored system data. Equivalent thresholds for a plurality of rules are computed using an invariant network developed by extracting the invariants. For a given time window, a set of alerts are received from a system being monitored. A measurement value of the alerts is compared with a vector of equivalent thresholds, and the set of alerts is ranked.

19 Claims, 6 Drawing Sheets

RANKING THE IMPORTANCE OF ALERTS FOR PROBLEM DETERMINATION IN LARGE SYSTEMS

RELATED APPLICATION INFORMATION

This application claims priority to provisional application Ser. No. 61/054,824 filed on May 21, 2008, incorporated herein by reference.

BACKGROUND

1. Technical Field

The present invention relates to computer system and network management and more particularly to system and methods for determining importance of alerts in computing systems for problem determination.

2. Description of the Related Art

The complexity of large computing systems has raised unprecedented challenges for system management. Rule-based systems are widely deployed in practice for operational system management. However, the alerts from various rules usually have different problem reporting accuracy because their thresholds are often manually set based on operators' experience and intuition. In the meantime, due to system dependencies, a single problem many trigger many alerts at the same time in large systems and a critical question is which alert should be analyzed first in the following problem determination process.

In current rule-based systems, this is handled with two possible solutions. In one solution, each rule works in its isolated local context and operators have to check alerts one by one. They may use some limited domain knowledge to decide the importance of alerts. For example, an alert from a DNS server is more important than an alert from a printer. Such an approach is not scalable and practical for large systems with huge complexity.

In a second solution, event correlation mechanisms are used to correlate a set of alerts with a specific problem, i.e., to define the signatures of known problems with a set of alerts. This approach has to assume prior knowledge of various problems and their signatures. However, many problems are not anticipated and well understood in large and complex IT systems. Due to system dynamics and uncertainties, even the same problem may manifest itself in very different ways. Therefore, it is difficult to precisely define problem signatures in complex and dynamic systems.

SUMMARY

A system and method for prioritizing alerts includes extracting invariants to determine a stable set of models for determining relationships among monitored system data. Equivalent thresholds for a plurality of rules are computed using an invariant network developed by extracting the invariants. For a given time window, a set of alerts are received from a system being monitored. A measurement value of the alerts is compared with a vector of equivalent thresholds, and the set of alerts is ranked.

Another method for prioritizing alerts includes collecting historical monitoring data from one or more system components; extracting invariants to determine a stable set of models for determining relationships among the historical monitoring system data; collecting management rules from system data; components being monitored; computing equivalent thresholds for the management rules using an invariant network developed by extracting the invariants; for a given time window, receiving a set of alerts from the system components being monitored; comparing a measurement value of the alerts with a vector of equivalent thresholds to compute a number of threshold violations (NTVs); and sorting the NTVs to rank the set of alerts.

A system for prioritizing alerts includes a program storage media configured to store an invariants network constructed using measurements as nodes and an edges to represent invariant relationships among monitored system data. The invariant network is configured to compute equivalent thresholds for a plurality of rules. An alert generator configured to generate alerts, for a given time window for a system being monitored. A peer review mechanism is configured to compare a measurement value to a local threshold and to equivalent thresholds mapped from other rules to determine the importance of the alerts.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A peer review mechanism and method are provided to rank the importance of alerts where the top ranked alerts are more likely to be true positives. After comparing a metric value against its threshold to generate alerts, the present principles also compare values with the equivalent thresholds from many other rules to determine the importance of alerts. The present approach has been evaluated and demonstrated its effectiveness.

The present embodiments include a peer review mechanism where a measurement is not only compared to a local threshold but also the equivalent thresholds mapped from other rules to determine the importance of its alerts. The top ranked alerts are more important because they get consensus from other rules and are more likely to be true positives. Operators can use the top ranked alerts as trustworthy evidence to prioritize their problem determination process to prevent being misled by many false alerts.

An invariant technology is able to discover invariant relationships between monitoring metrics. For example, if x, y are CPU usages of two machines, we automatically extract their relationships, e.g., y=f(x). With such an invariant equation, we are enabled to map the threshold of one metric (e.g., x) into an equivalent value in the context of another metric (e.g. y). Therefore, we can map the thresholds of various rules into their equivalent thresholds in a global context to rank the "tightness" of the thresholds and further rank the importance of alerts. The measurement is not only checked by its own rule but also other rules from its peers. The top ranked alerts are more important because more peers would generate such an alert by themselves. While each threshold might not be precisely set, the present approach can boost problem reporting accuracy by introducing such a collaborative peer-review mechanism. The consensus from a group of rules is more accurate than an individual one, whose threshold might be biased.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
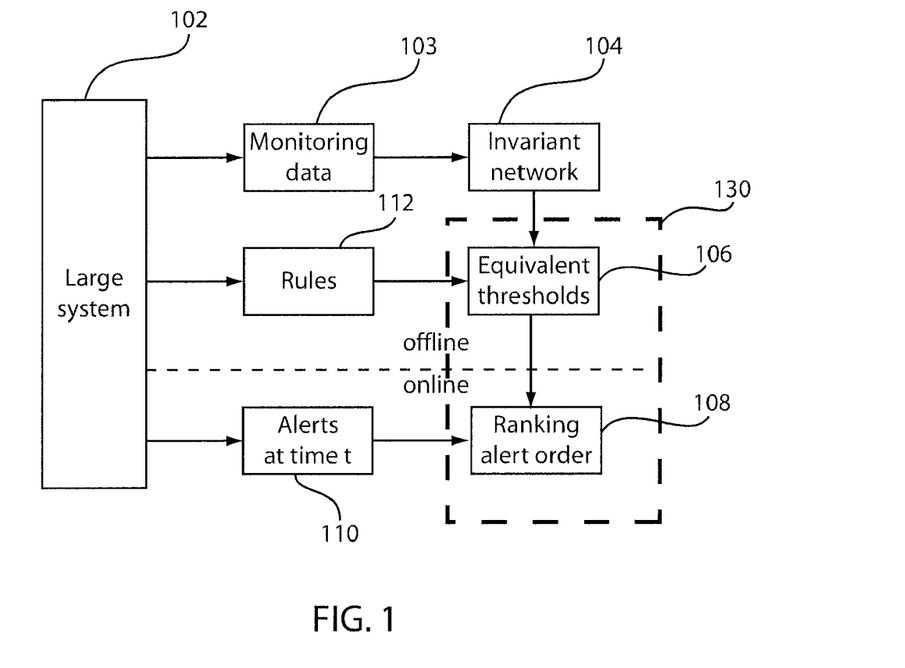
FIG. 1 is a block/flow diagram showing a system/method for prioritizing alerts in a computer system and/or network in accordance with the present principles.

Referring now to the drawings in which like numerals represent the same or similar elements and initially to FIG. 1, a block/flow diagram shows a system/method evaluates alerts by ranking the importance of the alerts from rule-based systems of heterogeneous and complex systems. Since there is no way to directly compare various metrics with different semantics and their fault models are unknown in practice, an approach to rank the alerts based on their probability of reporting true positives is beneficial.

A large system 102 may include a system having one or more processors and memory devices. The large system 102 may include one or more smaller systems. Each of the smaller systems may include a set of rules for determining and ranking system or software program alerts.

With the popularity of online services, many large-scale distributed systems and data centers have been built as the critical infrastructures to accommodate millions of online users simultaneously. The complexity of these giant systems has also raised unprecedented challenges for operators to maintain and manage them. These systems are usually deployed by integrating thousands of heterogeneous components including servers, routers, storage devices and software, which are typically provided by different vendors. Compared to large hardware-based systems such as telephone systems, the numerous software components running on computing systems obscure the dependencies and interactions among system components. While individual components like operating systems are already complex enough, the massive number of implicit component dependencies introduced by software have dramatically increased the complexity of today's computing systems. Meantime, many of such large systems are not static but always evolving with numerous changes such as security patch installations, software or hardware upgrades and configuration modifications. Therefore, the system scale, heterogeneity and dynamics as well as hidden dependencies all contribute to the difficulties in complexity management.

Many of such large systems are essentially mission critical systems and even minutes of system down time could lead to big revenue loss in business and further affect our normal life. For example, a system failure of BlackBerry™ email service affected millions of customers on Apr. 17, 2007. Therefore, service providers usually setup a large system management team to operate their infrastructures and services. In practice, operators collect large volumes of monitoring data from system components to track the status of their infrastructures.

Since it is impossible to manually scan and interpret a large volume of data in real time, operators usually set many rules to check data and trigger alerts. For example, if a selected metric (e.g., CPU usage) exceeds a given threshold, an alert will be generated to notify the operators who might follow up with an examination. However, due to system complexity, it is difficult to set good thresholds in rules, and a bad threshold often leads to false positives or false negatives in problem reporting.

Different operators may set different rules and thresholds in their systems based on their personal management experiences and intuition. For example, compared to a novice, an experienced operator may set better rules and thresholds; some operators might always tend to set higher thresholds than others. As a result, the alerts originating from various rules may have different accuracy in problem reporting and some alerts may be more "important" than others. It is difficult to normalize various rules and thresholds in rule management, especially for large systems that are managed by many operators.

Due to system dependencies, a single fault or performance problem may trigger many alerts at the same time. The question becomes which alert should be analyzed first because analyzing all alerts might take too much time to fix the problem and obviously not all of alerts are of the same importance. For mission critical systems, it is very important to reduce MTTR (Mean Time to Recovery) so as to keep high system reliability and availability.

In block 103, historical monitoring data is collected from the system components of the large system. In block 104, invariants are extracted, which will be explained in greater detail hereinafter. There exist many hidden invariant relationships among various monitoring data, whose intensity responds to the volume of external work-loads accordingly. Such an invariant relationship enables us to compare the threshold of one metric with that of another metric. In current rule-based systems, each rule works in its isolated local context by comparing a measurement with its threshold. Such a measurement is further compared with the equivalent thresholds mapped from other rules to rank its alerts in a global context. The top ranked alerts are more likely to be true positives that should be examined first in problem determination.

We introduce a collaborative peer review mechanism 130 in importance ranking so that a measurement is not only checked by its own rule but also other rules. As a result, an alert is ranked as more important if it gets more consensus from other rules.

System Invariants: System invariants characterize the hidden invariant relationships among system monitoring metrics. We use such an invariant relationship to map the threshold of one metric into an equivalent threshold in another metric, which enables ranking the thresholds from various rules and determining the importance of alerts.

Operators collect large amounts of monitoring data (103) from complex systems (102) to track their operational status. Log files and network traffic statistics are typical examples of such monitoring data. This monitoring data can be considered as the observable of internal system state. For online services, when a large volume of user requests flow through distributed systems, many of internal measurements respond to the volume of workloads accordingly. For example, network traffic volume and CPU usage are driven to go up and down by the intensity of workloads. Flow intensity describes the intensity with which internal measurements respond to the volume of workloads. For example, a number of SQL queries and average CPU usage (per sampling unit) are examples of such flow intensity measurements. For convenience, we use variables like x and y to represent flow intensity measurements.

Since flow intensity measurements are mainly driven to change by the same external factor—the intensity of workloads, they have similar evolving curves along time t. As time series, many flow intensity measurements have strong correlations, and here we use equations like $y=f(x)$ to characterize the relationship between two measurements x and y. If such relationships always hold along time, they are considered the invariants of the underlying system. No matter how workloads change, such system invariants remain the same. Note that the equation $y=f(x)$ and not the measurements x and y is considered an invariant.

With flow intensities measured at various points across large systems, we need to consider how to extract their relationships (block 104), i.e., with measurements x and y, determine how to learn a function f so that we can have $y=f(x)$? We illustratively employ AutoRegressive models with eXogenous inputs (ARX) to learn their linear relationships. At time t, we denote the flow intensities measured at two points by $x(t)$ and $y(t)$ respectively. The ARX model describes the following relationship between two flow intensities:

$$y(t)+a_1 y(t-1)+\ldots+a_n y(t-n)=b_a x(t-k)+\ldots+b_{m-1} x(t-k-m+1)+b \quad (1)$$

where [n, m, k] are the order of the model, and the relationship determines how many previous steps are affecting the current output. $a_i$ and $b_j$ are the coefficient parameters that reflect how strongly a previous step affects a current output. For convenience, we use θ to denote the set of coefficient parameters, i.e., $\theta=[a_1,\ldots,a_n,b_0,\ldots,b_{m-1},b]^T$.

Given a window of monitoring data $\{x(t),y(t)\}, 1 \leq t \leq N$, the Least Squares Method (LSM) may be employed to find the best θ that minimizes the error between the learned model and the given monitoring data. Details on how to calculate θ is included in our previous work, see Jiang et al, in "Discovering Likely Invariants of Distributed Transaction Systems for Automatic System Management", *The 3rd International Conference on Automatic Computing* (ICAC2006), pages 199-208, Dublin, Ireland, June 2006, incorporated herein by reference. We use the following equation to calculate a normalized fitness score for model validation:

$$F(\theta) = \left[1 - \sqrt{\frac{\sum_{t=1}^{N} |y(t)-\hat{y}(t|\theta)|^2}{\sum_{t=1}^{N} |y(t)-\bar{y}|^2}}\right], \quad (2)$$

where $\bar{y}$ is the mean of the real monitoring data $y(t)$. Given the monitoring data $x(t)$ and θ, $\hat{y}(t|\theta)$ is the output from the model shown in Equation (1). Basically Equation (2) introduces a metric to evaluate how well the learned model approximates the real data. Given two flow intensities, we can always learn a model but only a model with high fitness score characterizes the actual relationship. We can set a range of the order [n, m, k] rather than a fixed number to learn a list of model candidates and then select the model with the highest fitness score.

After we learn a model for two flow intensities, we still need to verify whether such a relationship can hold over time. To extract invariants from monitoring data, we try any combination of two measurements to construct a model first and then continue to validate whether this model fits with new observations, i.e., we use a brute-force search to construct all hypotheses of invariants first and then sequentially test the validity of these hypotheses in operation. Note that we always have sufficient monitoring data from a 24*365 operational system to validate these hypotheses over time. For each time window of monitoring data, we use Equation (2) to calculate the fitness score $F(\theta)$. Since models with low fitness scores do not characterize the real data relationships, we choose a threshold $\tilde{F}$ to filter out those models in sequential testing. Therefore, at each time window, a model with a fitness score lower than $\tilde{F}$ will be removed from the following testing process. After several time windows, the remaining stable sets of models are considered as the system invariants.

These invariants widely exist in large distributed systems, which are governed by the physical properties or software logic constraints of system components. For a typical three-tier web system including a web server, an application server and a database server, we collected, e.g., 111 measurements and further extracted 975 invariants among them.

Figure 2:
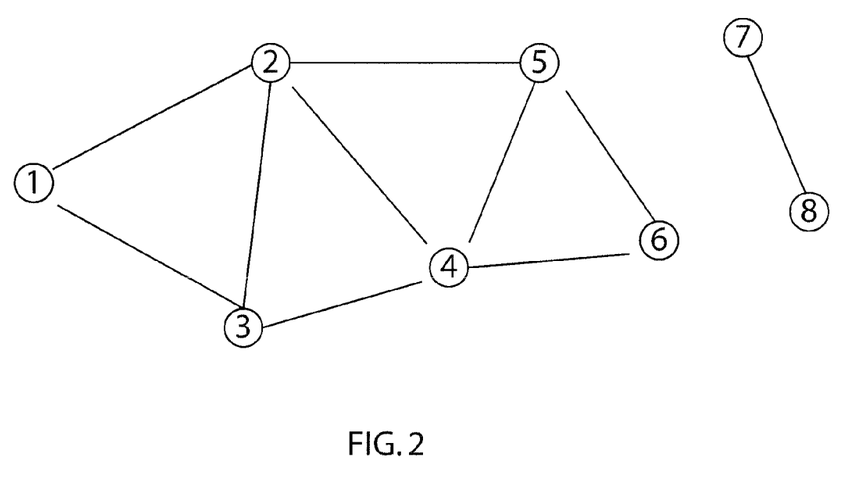
FIG. 2 is an example of invariant network employed in accordance with the present principles.

Referring to FIG. 2, value propagation in invariant networks will now be explained. FIG. 2 illustrates a small example of an invariant network that profiles the relationships among flow intensity measurements. Each node i (represented as nodes 1-8) represents a measurement $I_i$ while each edge represents an invariant relationship between the two associated measurements. Since we use a threshold $\tilde{F}$ to filter out those models with low fitness scores, not every pair of measurements would have invariant relationships. Therefore, there also exist disconnected sub-networks 7 and 8 in FIG. 2. All edges are bi-directional because we always construct two models (with reverse input and output) between two measurements.

Now consider a triangle relationship among three measurements such as $\{I_1, I_2, I_4\}$. Assume that we have $I_2=f(I_1)$ and $I_4=g(I_2)$, where f and g are both linear functions as shown in Equation (1). Based on the triangle relationship, theoretically we can conclude that $I_4=g(I_2)=g(f(I_1))$. According to the linear property of functions f and g, the function $g(f(.))$ should be linear as well, which implies that there should exist an invariant relationship between the measurements $I_1$ and $I_4$. However, since we use a threshold to filter out those models with low fitness scores, such a linear relationship may not be robust enough to be considered as an invariant. This explains why there is no direct edge between $I_1$ and $I_4$.

While each individual invariant models some local relationship between its associated measurements, the network of invariants could essentially capture many invariant constraints underlying large systems. Therefore, rather than using one or several models, we combine a large number of invariants into a network to characterize a large system and further use this network for system management tasks in block 104 of FIG. 1. A value can be propagated from one node into its equivalent values at other nodes by following the network. Later, this mechanism is used to compare the thresholds from various rules.

Without loss of generalization, assume that $I_1=x$. According to FIG. 2, we can reach the nodes $\{I_2, I_3\}$ with one hop from $I_1$. Given $I_1=x$, the question becomes how to follow the invariants to estimate other measurements. Since we use the model shown in Equation (1) to extract invariants among measurements, all invariants are the instances of this model template. In Equation (1), if we set the inputs $x(t)=x$ at all time steps, the output $y(t)$ converges to a constant value $y(t)=y$, which can be derived from the following equations:

$$y = a_1 y + \ldots + a_n y = b_0 x + \ldots + b_{m-1} x + b,$$

$$y = \frac{\sum_{i=0}^{m-1} b_i x + b}{1 + \sum_{j=1}^{n} a_j}. \quad (3)$$

For convenience, we use $f_{ij}$ to represent the propagation function from $I_i$ to $I_j$, i.e., $$f_{ij} = \frac{\sum_{k=0}^{m-1} b_k I_i + b}{1 + \sum_{k=1}^{n} a_k}.$$

Note that the order of invariant models is very small with $n, m \leq 2$. With Equation (3), given $I_1=x$, we can derive the values of $I_2$ and $I_3$. Since these measurements are the inputs of other invariants, in the same way, we can further propagate their values with one hop to $I_4$ and $I_5$, and with two hops to $I_6$. We cannot estimate the values of $I_7$ and $I_8$ because they are not reachable from $I_1$.

In FIG. 2, some nodes such as $I_4$, $I_5$ and $I_6$ can be reached from $I_1$ via multiple paths. Between the same two nodes, multiple paths may include different numbers of edges and each invariant (edge) also may have different accuracy in modeling two node relationships. The question is how to locate the best path for propagating a value from one node to another. At first, we will choose the shortest path (i.e., with minimal number of hops) to propagate the value between two nodes. Each invariant includes some modeling error when it characterizes the relationship between two measurements. These modeling errors could accumulate along a path and a longer path usually results in a larger estimation error.

A fitness score may be introduced to measure the robustness of invariants and an invariant with a higher fitness score leads to better accuracy in value propagation. For simplicity, here we use $F_{ij}$ to represent the average fitness score between the measurements $I_i$ and $I_j$. If there is no invariant between $I_i$ and $I_j$, we set $F_{ij}=0$. Given a specific path s between two nodes, we can always derive an accumulated score $q_s=\Pi F_{ij}$ to evaluate the accuracy of the whole path. For multiple paths with same number of edges between two nodes, we can use a dynamic programming algorithm to determine the path with the highest score $q_s$ and then follow this path to propagate the value. Therefore, given a value at one node, we can always follow the invariant network to propagate this value to all other reachable nodes.

Referring again to FIG. 1, blocks 106 and 108 form an alerts ranking mechanism 130. In block 112, management rules are collected from the system, and in block 106, all equivalent thresholds are computed based on the rules (block 112) and the invariants (block 104).

At time t, a set of alerts are received from the system(s) in block 110, and a real measurement value of each alert is compared with its vector of equivalent thresholds to calculate its Number of Threshold Violations (NTV) in block 108. The NTVs are sorted to rank the set of received alerts. The program path returns to block 110 for a next time window.

Rules and Fault Models: Operators deploy monitoring agents and collect real-time monitoring data to track the operational status of their systems (block 103). Rule-based systems are widely used to scan data and trigger alerts for problem determination. However, it is difficult to set good rules and thresholds in complex systems. In practice, operators often set up rules and thresholds based on their system management experience and intuition. As a result, alerts originating from various rules often include a large number of false positives. Large numbers of false positives often frustrate field operators so that they either ignore the alerts or increase their thresholds to filter out the alerts, which may conversely lead to high false negative rates.

In the present system, rules are employed in block 112 to assist in the determination of equivalent thresholds across systems. Large systems are often monitored and managed by hundreds of operators who have responsibilities for different system segments. Each operator may have his own preference or bias to set up rules and thresholds in his local portion of systems. In fact, some system components may also include management rules designed by their vendors. Since all these rules and thresholds are set in their local context with heterogeneous components, it is difficult to normalize thresholds and manage rules in large systems. Due to system dependencies, a single problem may trigger a storm of alerts in large systems. Many of the alerts might be false positives because of a biased threshold setting.

Since these rules cannot be easily compared under heterogeneous settings, it is difficult to decide which alerts are important. In a small system, operators may use domain knowledge to decide which category of alerts is more important. For example, an alert from a DNS server might be more important than that from a printer. However, for large systems with huge complexity, such an approach is obviously not scalable and practical. Many large systems are critical infrastructures for service providers to run their online services and generate revenues. Operators have to fix any problems promptly so as to maintain high system reliability and availability. Therefore, it is too time-consuming to analyze every alert without any guidelines and operator may also waste much time on analyzing false positives. To this end, the present principles provide a new approach to rank the importance of alerts, which operators can consult as a guideline to prioritize their problem determination process.

To this end, rules (112) for a system may include any limitation or pattern. In one example, a rule includes a predicate and an action. For example, given a measurement x (e.g. CPU usage), we have such a rule as: if($x > x^T$), then generate_alert1, where $x^T$ is the threshold. The predicate can include other single logic conditions like "$x < x^T$" or several joint conditions such as "$x > x^T$ and $y > y^T$". The alert may also include text messages to explain itself. Such rule definitions are employed for alarm management in commercial systems. For example, in VMware's alarm management, users can define rules to monitor a VM's CPU and memory usage as well as its heartbeat number and generate alerts with two triggering options: "Is Above (<)" and "Is Below (<)". A default monitor for a virtual machine heartbeat is set to "Is Below" while default monitor for all other metrics is set to "Is Above". For simplicity, we use several rules as shown in the above example to illustrate the basic concepts of the present embodiments.

Figure 3:
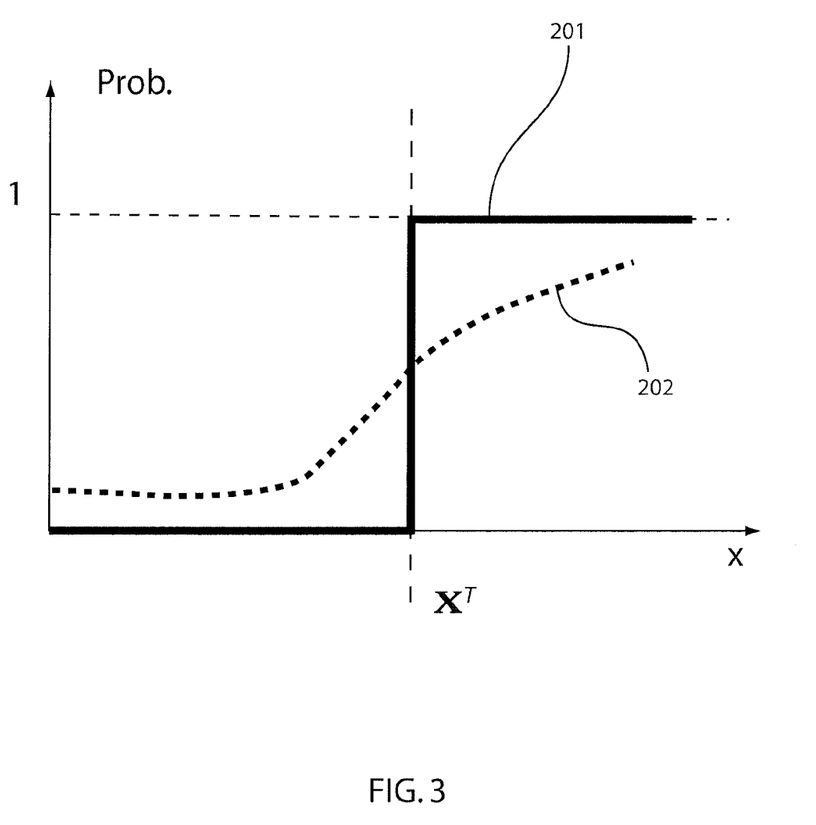
FIG. 3 is a graph showing an illustrative fault model for providing a threshold for comparison to monitored data.

Theoretically, there is an unknown fault model behind a rule. Referring to FIG. 3, two examples of such models are represented by two curves 201 and 202, respectively. The x-axis is the value of the measurement x while the y-axis represents the probability of fault occurrence. Since the rule is set with the predicate $x>x^T$, it implies that the probability of fault occurrence increases (or at least stays constant) with the growth of x. Otherwise, operators will not set such a predicate to generate alerts. Conversely, if the predicate is $x<x^T$, the probability of fault occurrence is expected to increase with the decrease of x. Operators may also set a predicate like $x_1^T<x<x_2^T$ if a fault only occurs during a specific range of x. A joint condition will be described because $x_1^T<x<x_2^T$ can be replaced with two basic logic equations $x>x_1^T$ and $x<x_2^T$.

Fault models underlying the basic predicates like $x>x^T$ will now be described. The fault model shown in curve 201 (the thick line) represents an ideal situation behind the rule setting, where the probability of fault occurrence is equal to one after a critical value. If this value is chosen as the threshold, we will get no false positives and negatives. However, a more realistic model is shown in curve 202 (the dotted line), where a given threshold will always lead to false positives and/or negatives in problem reporting. Since these theoretic fault models of various measurements are essentially unknown in practice, operators have to select the thresholds based on their experience and system knowledge. For example, an operator may use the statistics of historical data to decide a threshold.

Ranking the Importance of Alerts: In the embodiments described herein, we do not modify the rules and thresholds in existing rule-based systems, i.e., the mechanism for generating alerts is untouched. In fact, for heterogeneous components, only the operators administrating these components may have the right system knowledge to set up rules and thresholds. Instead, after receiving alerts from various system components in block 110 of FIG. 1, we analyze the importance of alerts with a peer review mechanism 130 so as to reduce false positive rates, which are the common headaches in system operation. The "importance" here is defined as the Probability of Reporting a True Positive (PRTP). In the following context, we use Prob(true|x) {it is a conditional probability} to denote the probability of reporting a true positive under the measurement value x. Without loss of generalization, assume that we have the following set of rules associated with the measurements in FIG. 2:

1. if($I_1>x$), then generate alert1;
2. if($I_2>y$), then generate alert2;
3. if($I_6>z$), then generate alert3;

where x,y,z are the thresholds. Now, given $I_1=x$, we follow the invariant network shown in FIG. 2 to propagate this value and calculate its equivalent values $I_2^x$ at node 2 and $I_6^x$ at node 6 respectively. In the same way, given $I_2=y$, we can also calculate its equivalent values $I_1^y$ at node 1 and $I_6^y$ at node 6 respectively. In addition, $I_1^z$ and $I_2^z$ can also be calculated in the same way. For every measurement listed in the above rules, it has three threshold values including its local threshold and two equivalent threshold values mapped from the other two rules. For example, for the measurement $I_1$, it has its local threshold x and two equivalent threshold values, $I_1^y$ and $I_1^z$ (which are determined in block 106 of FIG. 1).

Since the original thresholds x, y and z have different semantics, we cannot compare them directly. For example, assuming that x is about CPU usage and y is about network usage, it is meaningless to compare them in different contexts. Since the other thresholds y and z are mapped into the local context of x, we can compare their equivalent values with x to rank the importance of alerts.

Figure 4:
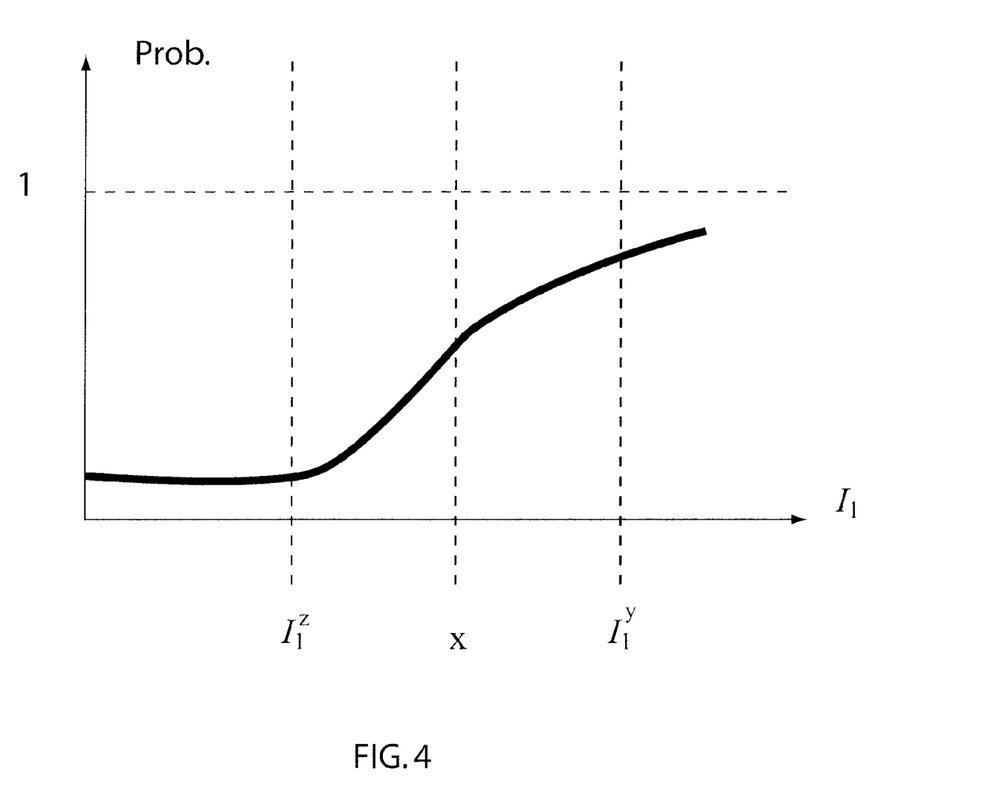
FIG. 4 is a graph showing a measurement being compared against a plurality of thresholds.

Referring to FIG. 4, comparing a measurement with multiple thresholds is illustratively depicted. Assuming that we have $I_1^z<x<I_1^y$ as shown, according to the fault model of FIG. 3, we can conclude that:

$$\text{Prob}(\text{true}|I_1^z) \leq \text{Prob}(\text{true}|x) \leq \text{Prob}(\text{true}|I_1^y). \quad (4)$$

Since the predicate logic of the above rules is ">", the PRTP will not decrease with the growth of the measurement. Based on this property, we can rank the order of the PRTPs without knowing their real values at different thresholds. Therefore, we do not need a known fault model to rank the PRTPs. Instead, we just need the predicate logic and rank the equivalent thresholds of rules to derive their PRTPs' ranking in block 108 of FIG. 1. If the predicate logic of the rules is "<", the order of PRTPs in Inequality (4) should be reversed.

In FIG. 4, we rank the thresholds of the rules and their PRTPs in the context of $I_1$. The question is whether such an order will change in the context of another measurement. For example, what is the order of y, $I_2^x$ and $I_2^z$ in the context of $I_2$?

Figure 5:
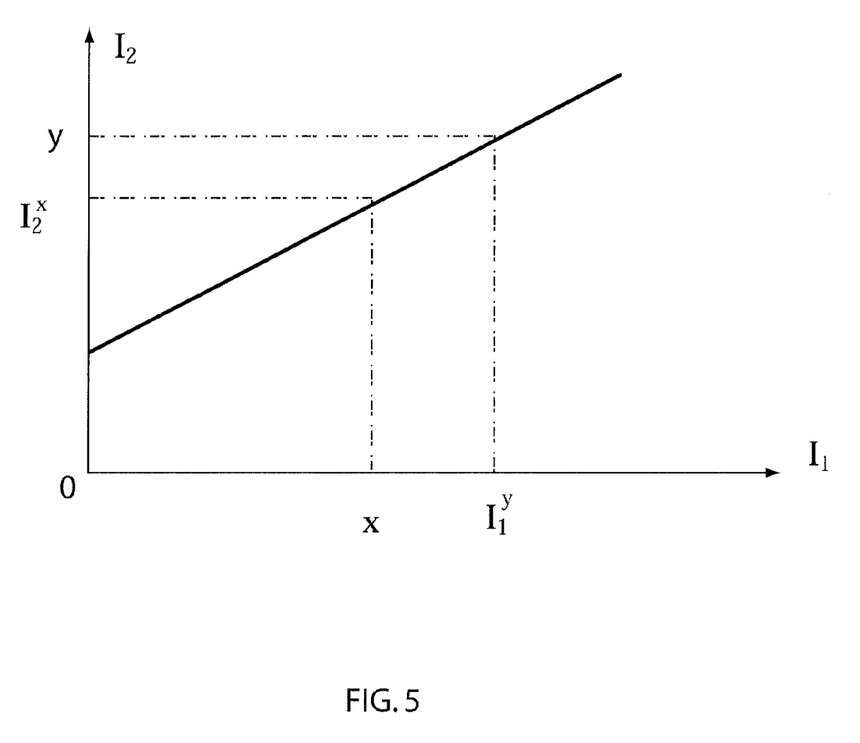
FIG. 5 is a graph showing thresholds for different context measurements.

FIG. 5 illustrates these thresholds in different contexts of measurements. Since $I_1$ and $I_2$ have a linear relationship, if $x<I_1^y$ along the axis of $I_1$, we will also have $y>I_2^x$ along the axis of $I_2$. Therefore, the order of thresholds will not change even if we map them into different context of measurements. As a result, the order of their PRTPs will not change either. Since the fault models underlying various measurements are different, the real values of PRTPs calculated in different measurement contexts might be quite different. For example, $\text{Prob}_{I_1}(\text{true}|x)$ (calculated with the fault model of $I_1$) may be different from $\text{Prob}_{I_2}(\text{true}|I_2^T)$ (calculated with the fault model of $I_2$) though their thresholds x and $I_2^x$ are equivalent. However, the order of PRTPs will not change no matter which fault models are used, i.e., if $\text{Prob}_{I_1}(\text{true}|x)<\text{Prob}_{I_1}(\text{true}|I_1^y)$ in the context of $I_1$, we will also have $\text{Prob}_{I_2}(\text{true}|I_2^x)<\text{Prob}_{I_2}(\text{true}|y)$ in the context of $I_2$.

Referring to FIG. 1, for some large systems (102), it is resource-consuming to feed large volumes of real-time monitoring data to a central point (e.g. network operation center) for data analysis. Instead, monitoring data (103) is processed by local rule-based agents, which forward their alerts rather than the data itself to the central point, i.e., we only see alerts but not monitoring data at the central point. In this case (denoted by Case I), we collect historical monitoring data (in block 103) offline to extract invariants (in block 104) and then collect the rules from various system components (in block 112). Following the extracted invariant network 104, we calculate the equivalent thresholds of rules in block 106 and further rank them in block 108 to decide the importance order of their alerts from block 110. For example, with Inequality (4), we rank the alerts with the following descent order of importance: alert2, alert1 and alert3. Since the lowest ranked alerts are likely to be false positives, operators might want to double check whether they have set the right thresholds for this portion of alerts.

Since the order of alerts will not change in different context of measurements, we can map all thresholds into the same context of a single measurement for comparison. Given n thresholds in an invariant network, here we just need n−1 mappings to compare these thresholds. All these steps may be done offline. Now, at any time t, after we receive a subset of alerts in block 110, we follow the order computed offline to rank this specific subset of alerts. For example, if both alert2 and alert3 are received at time t, we know that alert2 is more important than alert3 based on the ranking of all alerts. FIG.

1 illustrates the offline and online portions of Case I. Note that since real-time data is not available at the central point, we essentially use the static thresholds rather than the current measurement values to rank the importance of alerts, i.e., mathematically we assume that $Prob(true|I,I>x)=Prob(true|x)$, where I is the measurement value and x is its threshold. This follows the fault model represented by curve 201 in FIG. 3.

In the above case, we do not consider how much the current measurement I deviates from its threshold x. In general, the curve 202 shown in FIG. 3 illustrates that $Prob(true|I,I>x)$ increases as the value of I grows. If both measurement values and alerts are available at the central point, we should use the real values rather than their thresholds to rank alerts. In this case (denoted by Case II), as shown in FIG. 4, we compare the real measurement value against all equivalent thresholds to determine the Number of Threshold Violations (NTV). Note that we only do such comparisons to calculate NTV after we receive an alert, i.e., the real value at least violates its local threshold so that its NTV is at least 1. For example, in FIG. 4, if $x<I_1<I_1^y$, NTV is 2 because $I_1$ is larger than the thresholds x and $I_1^z$. If $I_1>I_1^y$, NTV is 3. Note that the order of equivalent thresholds remains the same in different context of measurements. These equivalent thresholds are essentially used as the reference positions in different contexts to compare real values and later we use NTVs to rank alerts.

If a real measurement violates more equivalent thresholds, its alert has a higher PRTP and it is more important to follow up with an examination. Besides its local rule, the NTV essentially represents the number of other rules (peers) that agree with such an alert.

In Case II, we follow the same offline steps shown in FIG. 1 to collect monitoring data (103) and rules (112), extract invariants (104) and calculate the equivalent threshold values (106). However, given n measurements with thresholds in an invariant network, each threshold is mapped into the context of the other n−1 measurements and we have total n(n−1) mappings. As a result, each measurement has n thresholds including its local threshold and n−1 equivalent thresholds mapped from other rules. For example, $I_1$ has its local threshold x and two equivalent thresholds $I_1^y$ and $I_1^z$ mapped from the other two rules as well. All these steps are done offline and each measurement has a vector to store the equivalent thresholds in its context. Now at time t, after we receive a set of alerts online (110), the real measurement value associated with each alert is compared with all equivalent thresholds to determine its NTV. We then sort their NTVs to rank the importance of alerts.

The difference between Case I and Case II is whether we use real measurement values to rank alerts. In Case II, the central point receives the alerts as well as real measurement data. Conversely, in Case I, only the alerts are forwarded to the central point. However, the approaches in two cases can be unified with Method 1.

Method 1:
1. Collect historical monitoring data from systems;
2. Extract invariants;
3. Collect management rules from systems;
4. Compute all equivalent thresholds.
5. At time t, receive a set of alerts from systems;
6. Compare the real measurement value of each alert with its vector of equivalent thresholds to calculate its Number of Threshold Violations (NTV);
7. Sort NTVs to rank the set of received alerts;
8. Return to Step 5.

At step 6, if we replace the real measurement value with its local threshold value, essentially we can compare this local threshold with the equivalent thresholds of other rules to get NTV. If we sort the NTVs, we will get the same order of alerts as that resulting from Case I. Some rules may have a dynamic thresholding mechanism. For every new threshold, at step 4, Method 1 should re-propagate its new value to the other n−1 nodes once.

In Case II, we can map the real measurement values into the same context and compare them directly to rank alerts. However, when many rules are violated under various system faults, their measurements may not follow the original invariant relationships anymore. Therefore, we cannot use the same invariant network to propagate a value from one node to others at this time. In fact, if we still have the same invariant network, the real values observed at two nodes should exactly reflect their mapping relationship and they are already "equivalent", i.e., we can just observe the real values rather than map their values. Instead, in Method 1, it is the threshold value that propagates through the invariant network because the thresholds of various rules are arbitrarily set and do not follow those invariant relationships. Conversely, measurement values are observed from real systems, and they naturally follow the constraints of their underlying systems.

Real measurements are locally compared to the equivalent thresholds that are mapped from other rules. Note that these equivalent thresholds are mathematically derived but do not exist in real systems. They are employed as the references to compare the aggressiveness or conservativeness of operators' threshold selection practice. Even if some invariants will not hold at some threshold values in reality, the "virtual" equivalent thresholds can still be calculated in the same way and used as the references to compare the "tightness" of various rules. In addition, it is unnecessary to rank alerts with small differences. For example, if the real measurement values of two alerts both violate all equivalent thresholds, they are equally critical though their real values may have some differences. Therefore, in Method 1, we use NTVs rather than real measurements to rank alerts.

Figure 6:
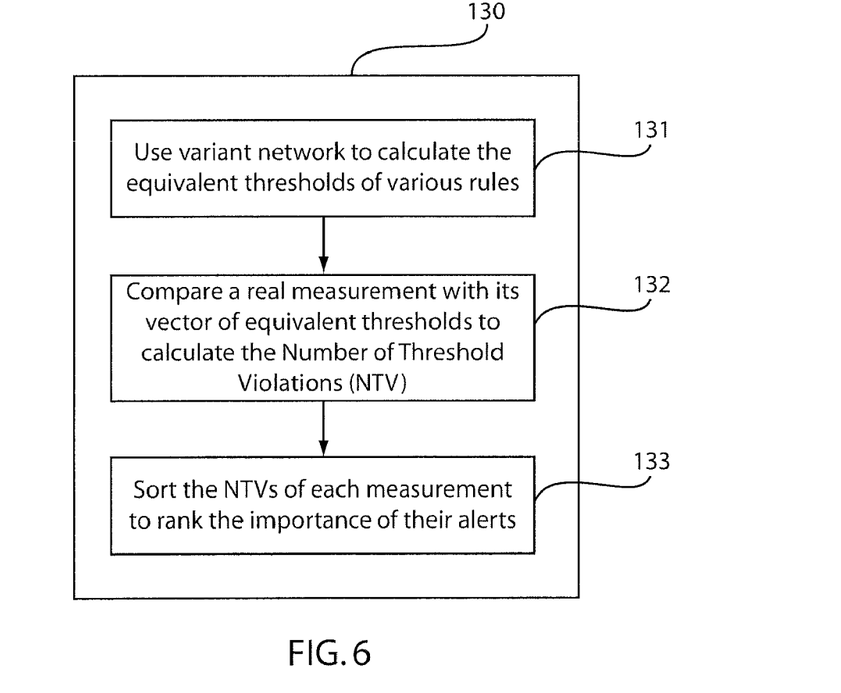
FIG. 6 is a block/flow diagram showing an alert ranking mechanism for prioritizing alerts in greater detail in accordance with an illustrative embodiment.

Referring to FIG. 6, the alerts ranking mechanism 130 is shown in greater detail. In block 131, an invariant network is employed to calculate equivalent thresholds for various rules. In block 132, a real measurement is compared with its vector of equivalent thresholds to compute a number of threshold violations (NTV). In block 133, the NTV's of each measurement are sorted to rank the importance of their alerts.

The present embodiments could add value to existing invariant technology in at least the following aspects: 1. It can immediately improve the current rule-based systems by introducing the present approach to rank the importance of alerts so that operators can prioritize their problem determination process to fix problems much faster with higher accuracy. The present approach is able to filter out those alerts that are more likely to be false positives. 2. Since the low ranked alerts are more likely to be false positives, operators can use this information to double check whether they have set the right thresholds for these portions of alerts and further improve the problem reporting accuracy. This could greatly reduce the cost of system management since operators will not be flooded with large number of false alerts.

Extensions: In current rule-based systems, each measurement is compared with its own threshold to generate alerts and each rule works in its isolated local context. Such a measurement is further compared with the equivalent thresholds mapped from other rules to determine the importance of its alert. Therefore, with invariant networks, we are enabled to bring individual thresholds into a global context. We introduce a peer-review mechanism so that a measurement is not only checked by its own rule but also other rules from its peers. Alerts are ranked based on NTVs, which represent how many peers agree with a local threshold. An alert with higher NTVs should be ranked more important because more peers would generate such an alert by themselves. Operators set rules and thresholds by their experience and intuition. While each threshold might not be precisely set, the present approach can boost problem reporting accuracy by introducing such a collaborative peer-review mechanism. The consensus from a group of rules is more accurate than an individual one, whose threshold might be biased. Though we use the "fault models" to illustrate our concept, our approach can also be used to manage alerts for other tasks such as performance and security management. For example, we may replace fault models with attack models or anomaly models for alarm management of security problems.

We assume that the predicate logic of all rules is "$x > x^T$" (denoted by ">" logic), where x is the measurement and $x^T$ is its threshold. If the predicate logic of rules is "$x < x^T$" (denoted by "<" logic), our approach and Method 1 remain the same. However, under "<" logic, if a measurement value gets smaller, its NTVs will be higher, which is reversed under ">" logic. In practice, some rules have ">" logic while others may have "<" logic. The question is how to rank alerts from the mixture of these rules. Since the fault models behind various measurements are unknown, we rank the PRTPs of alerts without knowing their real values. However, due to different fault models, we cannot rank the PRTPs by comparing one threshold in ">" logic with another one in "<" logic, i.e., the order of PRTPs cannot be directly derived from the order of thresholds. For example, under ">" logic, the PRTP increases as the measurement value grows. Conversely, under "<" logic, the PRTP decreases as the measurement value grows. We can only rank these alerts with their real PRTP values which are unknown in practice. Therefore, based on the predicate logic of rules, we have to split alerts into two clusters and rank them separately.

In fact, rules with ">" or "<" are set to monitor different system states such as system overloading or system down. At a specific system state, many of alerts may only belong to one cluster. Note that we only rank the set of alerts received at the same time steps.

The predicate of some rules may also include joint conditions such as "$x_1^T < x < x_2^T$" and "$x > x^T$ and $y > y^T$". The same question is how to rank alerts from such rules with others. A joint condition can be composed with several basic ">" and "<" logics. For example, "$x_1^T < x < x_2^T$" can be rewritten as "$x > x_1^T$" and "$x < x_2^T$". For all ">" logic in a joint "and" condition, the logic with the highest equivalent threshold is used to rank its alert because it subsumes all other ">" logic. Conversely, for all "<" logic in a joint "and" condition, the logic with the lowest equivalent threshold is used to rank its alert because it subsumes all other "<" logic as well.

For multiple logic in a joint "or" condition, we can use the real measurement values to determine which logic is satisfied and only this logic is then used to rank the alert associated with this condition. Note that a joint "or" condition is not common in practice because it cannot distinguish different scenarios in problem reporting. Therefore, we can convert multiple ">" logic (or "<" logic) in a joint condition into a single ">" logic (or "<" logic). If a joint condition includes both ">" and "<" logic, we will rank the single alert among both clusters of ">" and "<" alerts. A rule with a joint condition can be converted into a rule with a single ">" logic and/or a single "<" logic, which can be further ranked with other rules.

As shown in FIG. 2, there may exist several disconnected invariant networks and not every measurement node is always reachable from another one. It is difficult to rank the alerts originating from the measurements that are not reachable from each other. It is the invariant network that essentially enables us to estimate equivalent threshold values and further rank the importance of alerts. Therefore, we can only rank the alerts from the measurements within the same sub-network but not across disconnected sub-networks. However, in practice most of measurements belong to the same invariant network because they respond to the same external factor—the volume of work-loads accordingly. Compared to analyzing each alert separately, it is still meaningful to rank alerts within each invariant sub-network and further analyze every cluster of alerts with their importance order.

Figure 7:
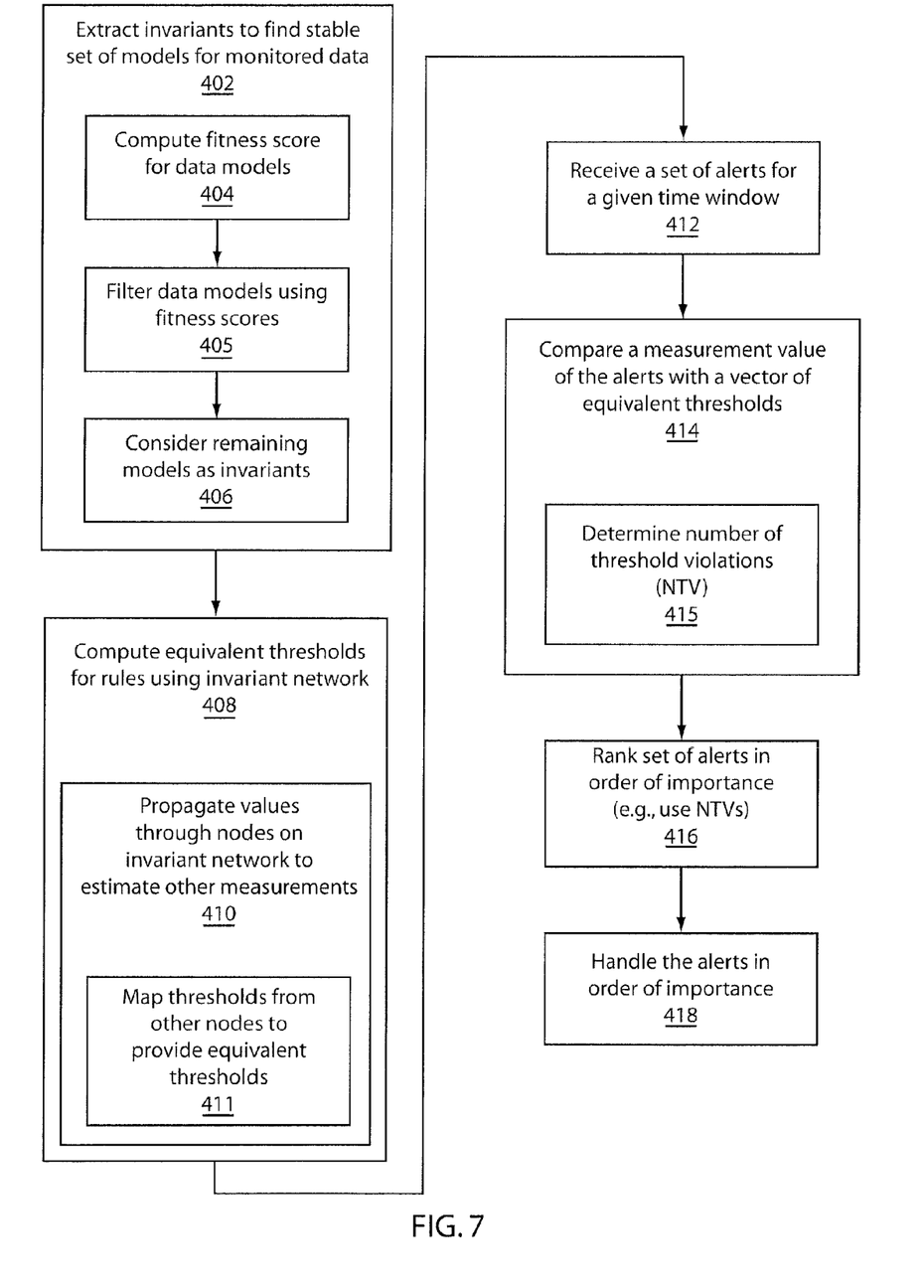
FIG. 7 is a block/flow diagram showing a system/method for prioritizing alerts in accordance with the present principles.

Referring to FIG. 7, a system/method for prioritizing alerts is illustratively depicted. In block 402, invariants are extracted to determine a stable set of models for determining relationships among monitored system data. This may include computing a fitness score for monitored data models in a given time window in block 404; filtering data models below a fitness threshold in block 405; and over a plurality of time windows, considering remaining monitored data models as invariants in block 406.

In block 408, equivalent thresholds are computed for a plurality of rules using an invariant network developed by extracting the invariants. The invariant network includes nodes which represent measurements. In block 410, values are propagated between the nodes of the invariant network to estimate other measurements. In block 411, the propagation of values includes mapping thresholds from other nodes to provide equivalent thresholds.

In block 412, for a given time window, a set of alerts is received from a system being monitored. In block 414, a measurement value of the alerts is compared with a vector of equivalent thresholds. This comparison of equivalent thresholds is used to determine an importance of an alert corresponding to the measurement value. The importance may include a probability of reporting a true positive. The comparison may be based on the number of threshold violations (NTVs) in block 415.

In block 416, the set of alerts are ranked. The ranking includes handling the alerts in order of importance in block 418. The ranking may be provided by sorting the NTVs to rank the set of alerts.

Having described preferred embodiments of a system and method for ranking the importance of alerts for problem determination in large systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for prioritizing alerts, comprising:
   extracting invariants stored on a computer readable storage medium to determine a stable set of models for determining relationships among monitored system data;
   computing equivalent thresholds for a plurality of rules using an invariant network developed by extracting the invariants;
   for a given time window, receiving a set of alerts from a system being monitored;
   comparing a measurement value of the alerts with a vector of equivalent thresholds; and
   ranking the set of alerts.

2. The method as recited in claim 1, wherein extracting invariants includes:
   computing a fitness score for monitored data models in a given time window;
   filtering out the monitored data models below a fitness threshold; and
   over a plurality of time windows, considering remaining monitored data models as invariants.

3. The method as recited in claim 1, wherein the invariant network includes nodes which represent measurements and further comprising propagating values between the nodes of the invariant network to estimate other measurements.

4. The method as recited in claim 1, wherein propagating values includes mapping thresholds from other nodes to provide equivalent thresholds.

5. The method as recited in claim 1, wherein comparing a measurement value of the alerts with a vector of equivalent thresholds includes comparing equivalent thresholds to determine an importance of an alert corresponding to the measurement value.

6. The method as recited in claim 1, wherein the importance includes a probability of reporting a true positive.

7. The method as recited in claim 1, wherein ranking includes handling the alerts in order of importance.

8. The method as recited in claim 1, wherein comparing a measurement value of the alerts with a vector of equivalent thresholds includes determining a number of threshold violations (NTVs); and sorting the NTVs to rank the set of alerts.

9. A method for prioritizing alerts, comprising:
   collecting historical monitoring data from one or more system components;
   extracting invariants stored on a computer readable storage medium to determine a stable set of models for determining relationships among the historical monitoring system data;
   collecting management rules from system components being monitored;
   computing equivalent thresholds for the management rules using an invariant network developed by extracting the invariants;
   for a given time window, receiving a set of alerts from the system components being monitored;
   comparing a measurement value of the alerts with a vector of equivalent thresholds to compute a number of threshold violations (NTVs); and
   sorting the NTVs to rank the set of alerts.

10. The method as recited in claim 9, wherein extracting invariants includes:
    computing a fitness score for monitored data models in a given time window;
    filtering out the monitored data models below a fitness threshold; and
    over a plurality of time windows, considering remaining monitored data models as invariants.

11. The method as recited in claim 9, wherein the invariant network includes nodes which represent measurements and further comprising propagating values between the nodes of the invariant network to estimate other measurements.

12. The method as recited in claim 11, wherein propagating values includes mapping thresholds from other nodes to provide equivalent thresholds.

13. The method as recited in claim 9, wherein comparing a measurement value of the alerts with a vector of equivalent thresholds includes comparing equivalent thresholds to determine an importance of an alert corresponding to the measurement value.

14. The method as recited in claim 9, wherein the importance includes a probability of reporting a true positive.

15. The method as recited in claim 9, wherein sorting includes handling the alerts in order of importance.

16. A system for prioritizing alerts, comprising:
    a program storage media stores an invariants network constructed using measurements as nodes and edges to represent invariant relationships among monitored system data, the invariant network being configured to compute equivalent thresholds for a plurality of rules;
    an alert generator configured to generate alerts, for a given time window for a system being monitored; and
    a peer review mechanism configured to compare a measurement value to a local threshold and to equivalent thresholds mapped from other rules to determine the importance of the alerts.

17. The system as recited in claim 16, wherein the invariant network includes nodes which represent measurements and values are propagated between the nodes of the invariant network to estimate other thresholds or measurements.

18. The system as recited in claim 16, wherein the importance includes a probability of reporting a true positive.

19. The system as recited in claim 16, wherein the measurement value of the alerts includes a vector of equivalent thresholds having a number of threshold violations (NTVs).

* * * * *